(12) United States Patent
Watts et al.

(10) Patent No.: US 7,219,856 B2
(45) Date of Patent: May 22, 2007

(54) UAV RECOVERY SYSTEM

(75) Inventors: Michael A. Watts, Bel Air, MD (US); George Raymond Root, Jr., Gambrills, MD (US); David M. Adamski, Pasadena, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 111 days.

(21) Appl. No.: 11/050,930

(22) Filed: Feb. 4, 2005

(65) Prior Publication Data

US 2007/0051849 A1    Mar. 8, 2007

(51) Int. Cl.
*B64F 1/02*    (2006.01)

(52) U.S. Cl. .................................... 244/110 F

(58) Field of Classification Search ............ 244/110 C, 244/110 F, 116; 114/259, 261, 262
See application file for complete search history.

(56) References Cited

U.S. PATENT DOCUMENTS

| | | | | |
|---|---|---|---|---|
| 965,881 | A * | 8/1910 | Draper | 244/110 F |
| 968,339 | A * | 8/1910 | Geraldson | 244/63 |
| 1,144,505 | A * | 6/1915 | Stefman | 244/63 |
| 1,383,595 | A * | 7/1921 | Black | 244/63 |
| 1,428,163 | A * | 9/1922 | Harriss | 244/63 |
| 1,731,091 | A * | 10/1929 | Belleville | 244/110 F |
| 1,836,010 | A * | 12/1931 | Audrain | 244/63 |
| 1,842,432 | A * | 1/1932 | Stanton | 244/63 |
| 1,912,723 | A * | 6/1933 | Perkins | 244/63 |
| 2,448,209 | A * | 8/1948 | Boyer | 244/110 F |
| 2,783,957 | A * | 3/1957 | O'Neil et al. | 244/110 C |
| 2,872,136 | A * | 2/1959 | Cotton | 244/110 C |
| 2,919,871 | A * | 1/1960 | Sorensen | 244/110 C |
| 2,919,872 | A * | 1/1960 | Nord | 244/110 C |
| 3,383,076 | A * | 5/1968 | Van Zelm et al. | 244/110 C |
| 4,147,317 | A | 4/1979 | Mayhew et al. | |
| 4,236,686 | A * | 12/1980 | Barthelme et al. | 244/116 |
| 4,311,290 | A * | 1/1982 | Koper | 244/110 R |
| 4,523,729 | A * | 6/1985 | Frick | 244/115 |
| 4,753,400 | A | 6/1988 | Reuter et al. | |
| H628 | H * | 4/1989 | McIngvale | 342/33 |
| 6,264,140 | B1 * | 7/2001 | McGeer et al. | 244/110 F |
| 6,604,732 | B1 * | 8/2003 | Brinker | 256/1 |
| 6,874,729 | B1 * | 4/2005 | McDonnell | 244/63 |
| 7,059,564 | B2 * | 6/2006 | Dennis | 244/110 F |
| 2005/0230536 | A1 * | 10/2005 | Dennis et al. | 244/110 C |

OTHER PUBLICATIONS http://www.boeing.com/news/releases/2004/q2/nr_040511m.html (available on the web May 22, 2004).*

* cited by examiner

*Primary Examiner*—Teri Pham Luu
*Assistant Examiner*—Edward J. Mayle
(74) *Attorney, Agent, or Firm*—DeMont & Breyer, LLC

(57) ABSTRACT

A UAV capture system is disclosed. In the illustrative embodiment, the UAV capture system is coupled to the deck of a sea-faring vessel. The UAV capture system includes a single arresting line that is supported by a stanchion. In the illustrative embodiment, the stanchion is disposed on a rotatable boom.

20 Claims, 4 Drawing Sheets

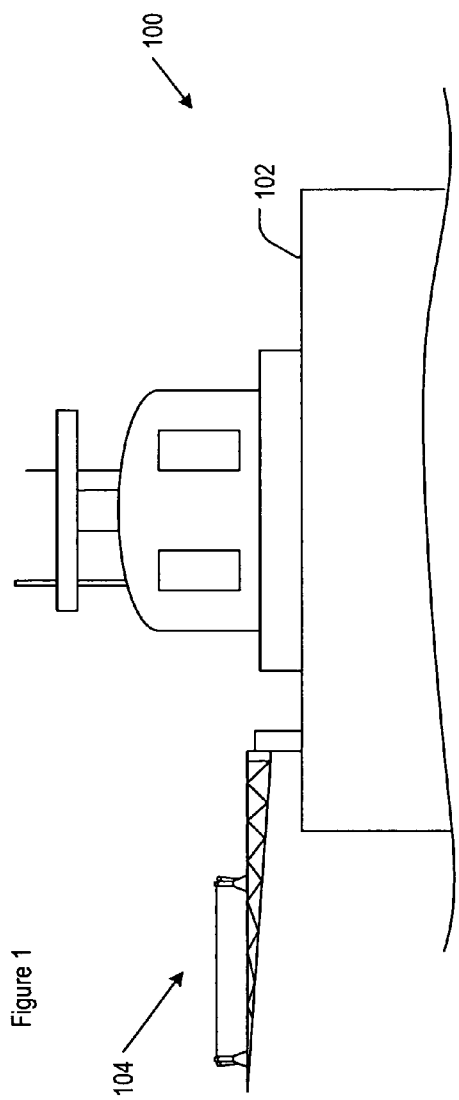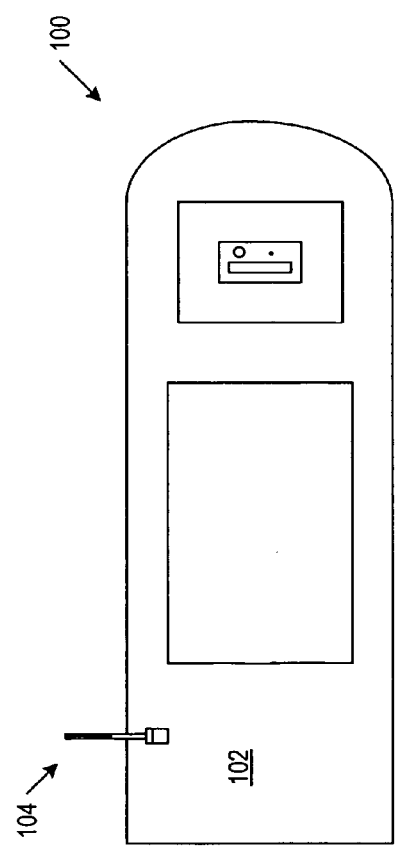

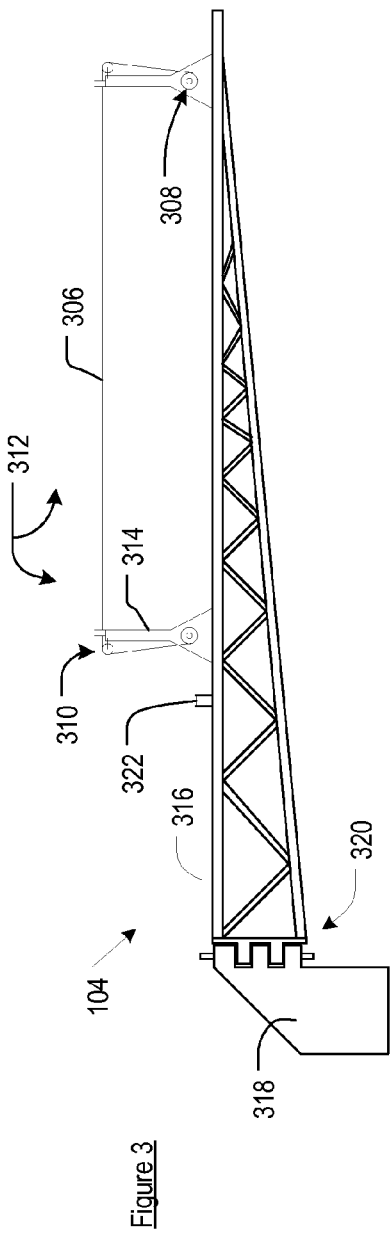
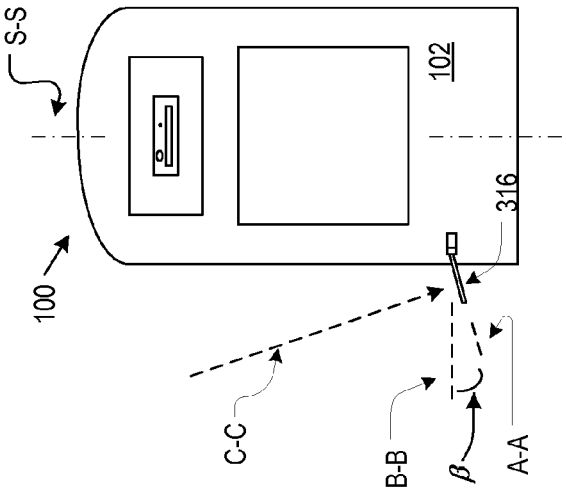
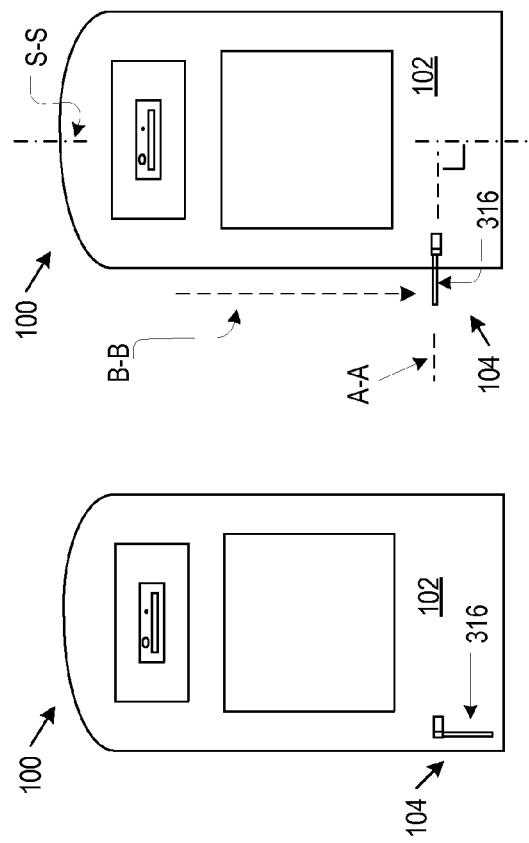

UAV RECOVERY SYSTEM

FIELD OF THE INVENTION

The present invention relates to systems for retrieving unmanned aerial vehicles ("UAVs").

BACKGROUND OF THE INVENTION

The UAV is now widely used for reconnaissance. Characteristically small, inexpensive, and pilot-less (i.e., unmanned cockpit), the UAV is ideal for that purpose.

Notwithstanding its low cost, the UAV is not considered to be a disposable item; recovery is at least attempted after each mission. Recovery is relatively straightforward when the UAV is operating over land. In such situations, the UAV is simply brought down on a makeshift landing field. Recovery is considerably more challenging, however, when the UAV is operating at sea. Due to the constant sway, roll, pitch and yaw of a ship at sea, it is quite difficult to safely land a UAV on the deck of a ship. In fact, deck landings are rarely attempted.

One alternative to the deck landing is the water "landing," wherein a UAV is simply ditched in the sea. This technique has its own drawbacks, including a reasonable likelihood of damage to the UAV and some risk to the recovery crew. A second alternative to a deck landing is to capture the UAV while it's still in flight.

U.S. Pat. No. 4,753,400 discloses a ship-mounted apparatus that recovers UAVs while they are in flight. The system disclosed in that patent includes a recovery net that is attached to a parachute. The net is also coupled, via a tow line, to a winch that is located on the deck of a ship. In use, the parachute floats the recovery net to a desired altitude for mid-air capture of the UAV. After capture, the recovery net and ensnared UAV are winched down to the deck.

The apparatus that is disclosed in U.S. Pat. No. 4,753,400 has several drawbacks. One drawback is that the apparatus disadvantageously requires a substantial amount of deck area. A second drawback is that a relatively labor-intensive untangling operation is required to free the UAV from the net. Furthermore, the relatively abrupt stop of a UAV in the recovery net can damage its fragile wings.

As a consequence, there is a need for a UAV recovery system that requires little deck space, enables rapid re-use of a UAV after recovery, and is less likely to damage a UAV than traditional recovery techniques.

SUMMARY OF THE INVENTION

The illustrative embodiment of the invention is a system for retrieving a UAV while it's in flight that avoids some of the drawbacks of prior art systems.

In the illustrative embodiment, the UAV recovery system is configured for use at sea. In that configuration, the UAV recovery system includes an arresting line, a braking system that couples to the arresting line, a stanchion that supports the arresting line and the braking system, and a movable boom that supports the stanchion. The movable boom is coupled to the deck of a ship.

In operation, the movable boom is rotated to a position that places the stanchion and arresting line over the water off of the side of the deck. To retrieve a UAV, it is flown toward the arresting line. The UAV can either be remotely piloted (i.e., by a ship-board pilot) or it can be piloted autonomously, using a boom- (or stanchion-) mounted camera, a processor, and a transceiver.

In some embodiments, as the UAV approaches the arresting line, an arresting hook is deployed from the UAV. The hook engages the arresting line, thereby coupling the UAV to the arresting line.

Forward motion of the UAV causes the release of additional arresting line. At the same time, resistance is applied to the arresting line by a braking mechanism. This resistance counters the continued forward motion of the UAV. As a consequence, the UAV rapidly slows and, unable to sustain flight, falls.

Controlled release of the arresting line, as described above, enables the UAV to fall below the level of the boom. This prevents potentially damage-causing contact between the UAV and the boom that might otherwise occur. Yet, the UAV cannot fall into the sea since a limited amount of arresting line is released. In other words, the UAV comes to rest hanging from the arresting line below the boom but above the level of the water.

After the recovery system snares the UAV, the boom is rotated away from the water and positioned over the deck of the ship. In this position, the UAV is easily accessed by the crew. The UAV is detached from the arresting line and readied for its next mission. In some other embodiments, the boom is not rotated back over the deck; rather, a pole is extended by a crewperson to pull the arresting line and the UAV toward the deck.

The use of a single arresting line, rather than a net as used in the prior art, substantially decreases the risk of damage to the wings and other parts of the UAV. Furthermore, since a single line is used in preference to a net, there is no time lost in untangling the UAV from the net. Also, the illustrative embodiment of the UAV recovery system requires very little deck space; most of the system resides over the side of the deck.

The present UAV recovery system can also be used over land; in such embodiments, the movable boom is typically not required. Rather, the stanchions are coupled to a frame so that the system is free-standing.

These and other features of a UAV recovery system in accordance with the illustrative embodiment, and variations thereof, are described further in the Detailed Description below and depicted in the accompanying Drawings.

BRIEF DESCRIPTION OF THE DRAWINGS

FIGS. 1 and 2 depict respective side and top views of a UAV recovery system in accordance with the illustrative embodiment of the present invention. In FIGS. 1 and 2, the UAV recovery system is mounted on the deck of a ship.

FIG. 3 depicts further detail of the UAV recovery system of FIGS. 1 and 2.

FIGS. 4A–4C depict various positions of the boom of the illustrative UAV recovery system.

DETAILED DESCRIPTION

Figure 5A:
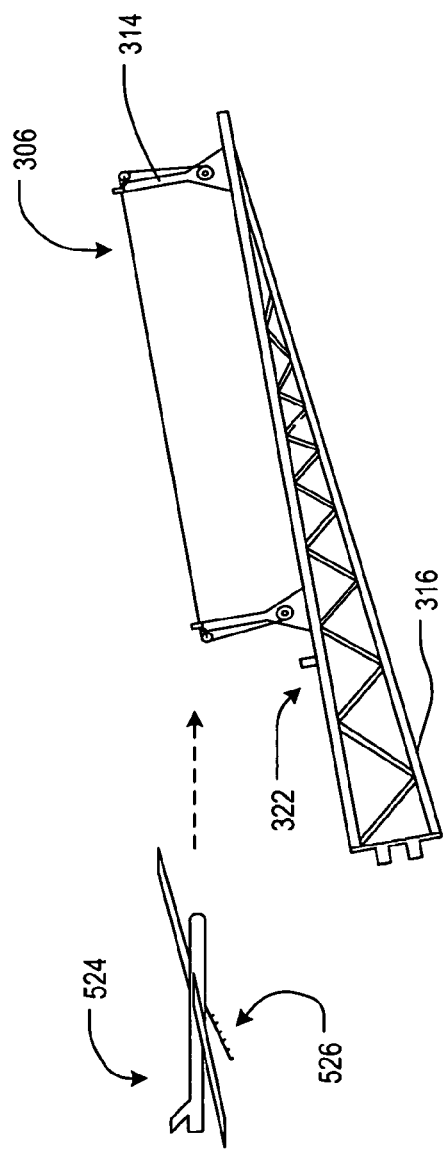
FIGS. 5A–5D depict the recovery operation wherein a UAV is snared in flight by the UAV recovery system.

FIGS. 1 and 2 depict, via respective side and top views, UAV recovery system 104 in accordance with the illustrative embodiment of the present invention. In the illustrative embodiment, the UAV recovery system is mounted to deck 102 of ship 100 to recover UAVs at sea. In some other embodiments, the UAV recovery system, with some modification, is used to recover UAVs over land.

As depicted in FIG. 3, UAV recovery system 104 includes arresting line 306, braking system 308, stanchion 312, and movable boom 316, mechanically interrelated as shown.

Stanchion 312, which comprises two upright members 314, supports arresting line 306. The arresting line couples to braking system 308, which is also supported by stanchion 312. Arresting line 306 rides on pulleys 310, which are disposed near the top of upright members 314. As described later in this specification, pulleys 310 facilitate movement of arresting line 306 in conjunction with the UAV recovery operation.

Stanchion 312 depends from boom 316. The boom is coupled, via base 318, to the deck of a ship (e.g., see FIGS. 1 and 2). In the illustrative embodiment, boom 316 is movable about pivot point 320. Video camera and transmitter 322 is mounted to boom 316.

For use at sea, UAV recovery system 104 is advantageously formed from a material(s) that is resistant to corrosion. Furthermore, since most UAVs are relatively lightweight and will have a relatively low net forward velocity at capture (about 20 knots), UAV recovery system 104 can be formed from lightweight materials. For example, and without limitation, suitable materials of construction for support elements (e.g., boom 316, stanchion 312, etc.) of UAV recovery system 104 include certain plastics and aluminum. In some embodiments, arresting wire 306 and portions of braking system 308 are formed of stainless steel. It will be clear to those skilled in the art, after reading this specification, which materials are suitable for use in UAV recovery system 104.

In the illustrative embodiment, braking system 308 comprises a pulley with a spring-loaded friction disk. Each of the two upright members 314 supports a pulley/friction disk arrangement. An additional length of arresting line 306 is wound around one or both of the pulleys of braking system 308. As described further below, some of this additional arresting line is released during the UAV recovery process to provide controlled braking of the UAV and to ensure that there is no contact between the ensnared UAV and boom 316.

In some other embodiments, braking system 308 can be coupled to boom 316, rather than the upright members 314. In some additional embodiments, braking system 308 comprises a single braking element (e.g., a single pulley/friction disk). A variety of different type of braking systems can be used. It will be clear to those skilled in the art, after reading this disclosure, how to specify, make, and use the disclosed braking system as well as other braking systems for use in conjunction with the illustrative embodiment of the present invention.

In the illustrative embodiment, upright members 314 are spaced about sixteen-feet apart and support arresting line 306 about 3 feet above boom 316. In other embodiments, upright members 314 can be somewhat closer together or further apart.

To the extent that upright members 314 support arresting line 306 at a relatively greater height above boom 316, there is a decreased likelihood of a UAV crashing into the boom on approach. On the other hand, this increases the sizes of UAV recovery system 104. These factors are weighed in determining a desired height of arresting line 306 above boom 316. Typically, arresting line 306 will be no more than 6 feet above boom 316.

There are also competing factors as to the spacing between upright members 314. In particular, to the extent that upright members 314 are spaced relatively closer to one another, it becomes relatively more difficult to snare a UAV on the arresting line. But if the upright members are spaced relatively further apart, boom 316 must be longer. Typically, upright members 314 will be spaced apart by a distance that is in a range of about twelve to about twenty feet.

FIGS. 4A–4C depict boom 316 (i.e., UAV recovery system 104) in various positions.

FIG. 4A depicts UAV recovery system 104 in a stowed position, wherein boom 316 is positioned above deck 102 (i.e., not over the side of the deck). In preparation for recovery of a UAV, boom 316 is moved from the stowed positioned to a recovery position as depicted in FIGS. 4B and 4C. In the recovery position that is depicted in FIG. 4B, axis A—A of boom 316 is substantially orthogonal to the long axis of S—S of ship 100. Furthermore, flight path B—B of a UAV on approach to the UAV recovery system is substantially parallel to axis S—S of ship 100.

In a second recovery position that is depicted in FIG. 4C, axis A—A of boom 316 is not orthogonal to axis B—B; rather, it positioned at some offset from perpendicular, as measured by angle $\beta$. The purpose for orientating boom 316 at an offset, as depicted in FIG. 4C, is to bring the UAV along flight path C—C that is not parallel to axis S—S of ship 100. If control of a UAV is lost on its approach to UAV recovery system 104, there is a reduced likelihood of crashing on the deck if the UAV follows flight path C—C as opposed to flight path B—B. In some embodiments, angle $\beta$ is 14.1 degrees, which is the approach angle used for landing aircraft on aircraft carriers.

FIGS. 5A–5D depict the approach and airborne capture of a UAV using UAV recovery system 104. For the description that follows, it is to be understood that boom 316 is placed in a desired recovery position (e.g., see FIGS. 4B and 4C) to receive UAV 524. For clarity of illustration, neither the base 318 nor ship 100 is depicted in FIGS. 5A–5D. It is also understood that UAV 524 is equipped with arresting hook 526 to engage arresting line 306. A variety of different arresting hook designs can suitably be used, such as the arresting hook that is disclosed in co-pending U.S. patent application Ser. No. 11/051,842 entitled "UAV Arresting Hook for use with UAV Recovery System," which is incorporated by reference herein. Those skilled in the art, after reading this disclosure, will be able to design, specify, make and use an arresting hook that is suitable for use in conjunction with the illustrative embodiment of the present invention.

FIG. 5A depicts UAV 524 on approach to arresting line 306. In some embodiments, UAV 524 is remotely controlled by a pilot that is stationed on the deck of the ship (not depicted). In some other embodiments, UAV 524 is either partially or fully autonomously controlled via various video and electronic systems. For autonomous control, video camera and transmitter 322, which is mounted on boom 316, transmits a video signal to a processor that is located aboard ship. In some embodiments, the processor runs automated target recognition and automated target tracking software and receives altimeter information that is transmitted from UAV 524 by way of a transceiver. Additionally, the processor receives data about the ship's movement (e.g., speed, heading, etc.), such as from an inertial measurement unit ("IMU") and other data that enables the processor to precisely determine the position (including height) of arresting line 306 and the position of UAV 524.

Figure 5B:
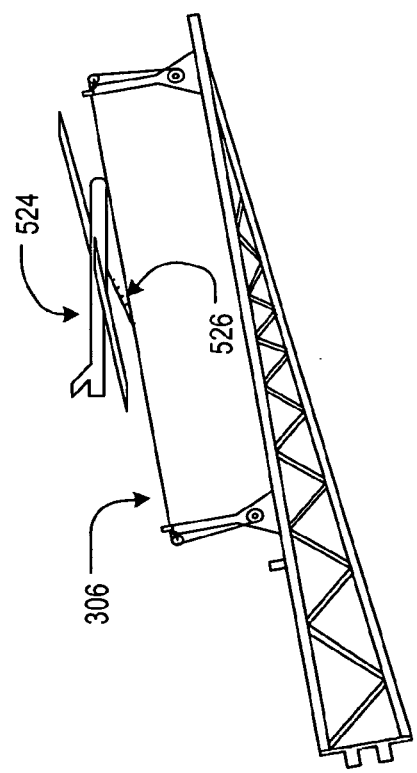

The transceiver transmits commands that originate from either (1) the remotely-located pilot or (2) the processor. Those commands cause UAV 524 to fly towards arresting line 306. As depicted in FIG. 5B, arresting hook 526 ultimately couples to arresting line 306.

Figure 5C:
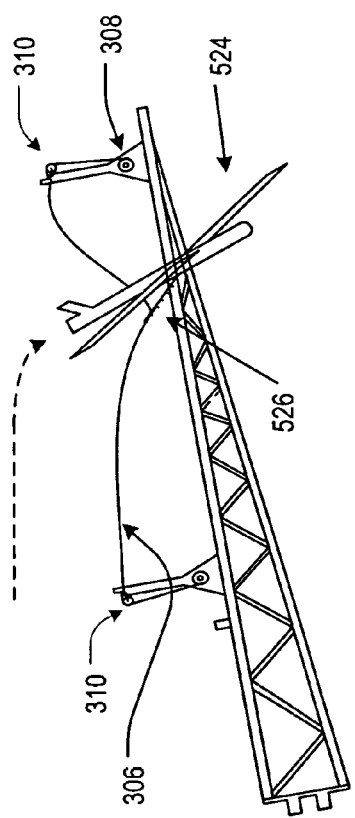

After arresting hook 526 and arresting line 306 are coupled, the arresting line experiences a "tugging" or "pulling" force due to the continued forward motion of UAV 524. This force results in the release of an additional amount of arresting line from braking system 308, as depicted in FIG. 5C. Pulleys 310 facilitate movement of arresting line 306.

The release of arresting line 306 is countered by a resistance that is applied by the braking system. The energy expended in overcoming this resistance causes UAV 524 to drop below stall speed and fall.

Figure 5D:
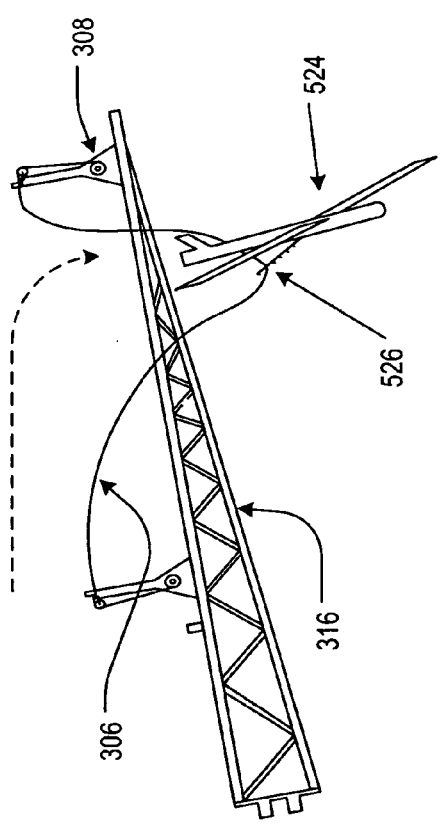

The frictional resistance applied by braking system 308 is controlled to ensure that a sufficient length of arresting line is released to enable UAV 524 to drop below boom 316, but not into the underlying water, as depicted in FIG. 5D. In the illustrative embodiment, wherein arresting line 306 is 3 feet above boom 316, an additional 7 to 10 feet of arresting line is released (due to the forward motion of UAV 524) to ensure that there is no contact between the boom and the UAV.

In some embodiments, UAV recovery system 104 also includes a "back-up system" (not depicted). The back-up system includes a second stanchion that supports two nets: one in an upright or vertical orientation rising and the other in a horizontal orientation near the base of the second stanchion. The second stanchion is located on a second boom that positions the nets "behind" arresting line 306. If arresting hook 526 fails to couple to the arresting line, the UAV will be stopped and usually captured by the upright net. If the UAV is stopped, but not ensnared by the upright net, it falls into horizontally-oriented net.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiment of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. An apparatus for airborne capture of an unmanned aerial vehicle, the apparatus comprising: a stanchion having two upright vertical members; a single arresting line for unmanned aerial vehicle capture, wherein said arresting line is supported in air between said upright vertical members, and wherein, at a time of said capture, said unmanned aerial vehicle is above said arresting line; and a braking system, wherein said arresting line is coupled to said braking system.

2. The apparatus of claim 1 further comprising a boom, wherein said stanchion is coupled to said boom.

3. The apparatus of claim 2 wherein said boom is rotatable between a first position and a second position.

4. The apparatus of claim 3 wherein said boom is coupled to a deck of a vessel, and further wherein:
   in said first position, said stanchion is disposed over a side of said deck above water;
   and, in said second position, said stanchion is disposed above said deck.

5. The apparatus of claim 4 wherein said stanchion is in a third position, wherein:
   said third position is between said first position and said second position;
   said boom is disposed above said water over said deck; and
   said arresting line is not orthogonal to a long axis of said vessel.

6. The apparatus of claim 1 further comprising a camera, wherein said camera is coupled to said stanchion.

7. The apparatus of claim 2 further comprising a camera, wherein said camera is coupled to one of said stanchion or said boom.

8. The apparatus of claim 7 further comprising a processor for receiving a signal from said camera.

9. The apparatus of claim 8 wherein said processor receives a signal that is representative of data selected from the group consisting of altimeter data from a UAV, geographical location data from a UAV, data pertaining to movement of a ship, data for determining a height of said arresting line, and weather data.

10. The apparatus of claim 1 further comprising an arresting hook for engaging said arresting line, wherein said arresting hook is attached to a UAV.

11. An apparatus for airborne capture of an unmanned aerial vehicle, said apparatus comprising: a movable boom, wherein said boom is coupled to a deck of a ship near a first end of said boom; a stanchion having two upright vertical members; a single arresting line for capturing said unmanned aerial vehicle, wherein said arresting line is supported in air between said upright vertical members, and further wherein said arresting line is disposed above said movable boom; and a braking system, wherein said arresting line is coupled to said braking system.

12. The apparatus of claim 11 wherein said movable boom is movable between:
   a first position, wherein both of said two upright vertical members of said stanchion are disposed over said deck; and
   a second position, wherein both of said two upright vertical members of said stanchion are not disposed over said deck.

13. The apparatus of claim 11 wherein said vertical members extend less than six feet above said boom.

14. The apparatus of claim 11 wherein a distance between said vertical members is within a range from about 12 feet to about 20 feet.

15. A method for airborne capture of an unmanned aerial vehicle, comprising: directing a UAV toward a length of an elevated, horizontally-disposed arresting line; coupling a hook, which depends from said UAV, to said arresting line, thereby capturing said UAV while in flight, and wherein, at a time of said capture, said UAV is disposed above said arresting line; releasing an additional length of arresting line after said hook and said arresting line are coupled to bring said UAV to rest; and maintaining said UAV in an elevated disposition, suspended by said arresting line, until after said UAV is brought to rest.

16. The method of claim 15 wherein the operation of releasing an additional length of arresting line further comprises applying a resistance during release of said arresting line thereby slowing forward motion of said UAV.

17. The method of claim 15 wherein the operation of directing a UAV further comprises manually flying said UAV toward said arresting line via remote control.

18. The method of claim 15 wherein the operation of directing a UAV further comprises autonomously controlling flight of said UAV via a system comprising a camera, a processor, and a transceiver.

19. The method of claim 16 wherein said arresting line is supported by a stanchion, and wherein said stanchion is supported by a boom, and further wherein said additional length of arresting line is sufficient to enable said UAV to come to rest below said boom.

20. The method of claim 19 wherein said boom is coupled to a deck of a ship, and wherein said method further comprises retrieving said UAV from said arresting line by one of either:

pulling said arresting line toward said deck; or rotating said boom over said deck.

* * * * *